(12) United States Patent
Refai et al.

(10) Patent No.: US 7,537,345 B2
(45) Date of Patent: May 26, 2009

(54) VOLUMETRIC LIQUID CRYSTAL DISPLAY FOR RENDERING A THREE-DIMENSIONAL IMAGE

(75) Inventors: Hakki H. Refai, Tulsa, OK (US); Erik Petrich, Norman, OK (US); James J. Sluss, Jr., Broken Arrow, OK (US); Monte P. Tull, Oklahoma City, OK (US); Pramode Verma, Tulsa, OK (US)

(73) Assignee: The Board of Regents of the University of Oklahoma, Norman, OK (US)

(*) Notice: Subject to any disclaimer, the term of this patent is extended or adjusted under 35 U.S.C. 154(b) by 0 days.

(21) Appl. No.: 11/789,674

(22) Filed: Apr. 25, 2007

(65) Prior Publication Data
US 2007/0247598 A1 Oct. 25, 2007

Related U.S. Application Data

(60) Provisional application No. 60/794,903, filed on Apr. 25, 2006, provisional application No. 60/877,404, filed on Dec. 27, 2006.

(51) Int. Cl.
*G03B 21/14* (2006.01)
*G02B 27/22* (2006.01)

(52) U.S. Cl. .................... 353/7; 359/471; 345/6
(58) Field of Classification Search ............ 353/7, 353/10; 359/458, 466, 471, 477; 349/15; 345/6
See application file for complete search history.

(56) References Cited

U.S. PATENT DOCUMENTS

| | | | | |
|---|---|---|---|---|
| 5,689,316 A * | 11/1997 | Hattori et al. | ............ | 349/74 |
| 5,813,742 A * | 9/1998 | Gold et al. | ............ | 353/88 |
| 6,100,862 A | 8/2000 | Sullivan | | |
| 6,302,542 B1 * | 10/2001 | Tsao | ............ | 353/7 |
| 6,377,229 B1 | 4/2002 | Sullivan | | |
| 6,466,185 B2 | 10/2002 | Sullivan et al. | | |
| 6,593,994 B2 * | 7/2003 | Son et al. | ............ | 352/65 |
| 6,806,849 B2 * | 10/2004 | Sullivan | ............ | 345/6 |
| 6,969,174 B1 * | 11/2005 | Radulescu | ............ | 353/7 |

OTHER PUBLICATIONS

K. Langhans, C. Guill, E. Rieper, K. Oltmann, and D. Bahr, "Solid Felix: A Static Volume 3D-Laser Display", Stereoscopic Display and Applications XIV, Proceedings of SPIE, vol. 5006, Santa Clara, CA, 14 pages, 2003.
David Ebert, Edward Bedwell, Stephen Maher, Laura Smollar, and Elizabeth Downing, "Realizing 3D Visualization Using Crossed-Beam Volumetric Displays," pp. 101-107, Aug. 1999.

* cited by examiner

*Primary Examiner*—William C Dowling
(74) *Attorney, Agent, or Firm*—Dunlap Codding, P.C.

(57) ABSTRACT

A volumetric liquid crystal display for producing a three-dimensional image is disclosed. The volumetric liquid crystal display includes a volumetric image space having at least two layers of LCD sheeting wherein each layer of LCD sheeting is selectively energized to form image slices. At least one projection system projects at least one array of electromagnetic energy of one or more wavelengths to intersect the energized layer of LCD sheeting illuminating image slices. Successive illumination of image slices on the layers of LCD sheeting provides the appearance of a three-dimensional image. Embodiments and methods of controlling and fabricating a three-dimensional image are disclosed.

23 Claims, 5 Drawing Sheets

VOLUMETRIC LIQUID CRYSTAL DISPLAY FOR RENDERING A THREE-DIMENSIONAL IMAGE

CROSS-REFERENCE TO RELATED APPLICATIONS

This Application claims priority under 37 C.F.R. 119(e) to U.S. Provisional applications U.S. Ser. No. 60/794,903, entitled VOLUMETRIC LIQUID CRYSTAL DISPLAY, filed Apr. 25, 2006 and U.S. Ser. No. 60/877,404, entitled VOLUMETRIC LIQUID CRYSTAL DISPLAY, filed Dec. 27, 2006, each of which is hereby incorporated by reference in its entirety.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO A "SEQUENCE LISTING", A TABLE, OR A COMPUTER PROGRAM LISTING APPENDIX SUBMITTED ON A COMPACT DISC AND AN INCORPORATION BY REFERENCE OF THE MATERIAL ON THE COMPACT DISC

Not applicable.

BACKGROUND OF THE INVENTION

There is now widely-acknowledged incentive, both commercially and industrially, for developing a color three-dimensional display system that can be viewed from unencumbered perspectives. Technological advances of the last decade have made scientists and engineers increasingly aware of three-dimensional imaging as both viable and realistic. However, the commercial systems in use have several drawbacks.

For example, current conventional three-dimensional autostereoscopic displays project two images that are recorded from two slightly different angles placed on top of each other toward a screen. A viewer wears special spectacles/goggles that filter out one of these images to allow each of the viewer's eyes to see only one of the projected images. The brain translates the two images into a perceived three-dimensional image. However, the three-dimensional image alone cannot be viewed from varying directions without the use of these special spectacles or goggles.

The transitioning of liquid crystal display (LCD) technology into the three-dimensional arena has provided a step away from the drawbacks of the autostereoscopic systems, however other disadvantages arise. For example, the Depthcube™ display, manufactured by Light Space Technologies Inc., provides a system for portraying a three-dimensional image within a stack of planar LCDs. However, the three-dimensional images can only be viewed from a single side of the image space, similar to traditional two-dimensional displays.

Accordingly, a three-dimensional imaging system and method of using the imaging system to provide better-quality images viewable from multiple angles, as compared with the currently available technologies, will provide a commercially and industrially marketable product.

BRIEF SUMMARY OF THE INVENTION

The present invention is related to a volumetric liquid crystal display for providing a three-dimensional image. In general, the volumetric liquid crystal display comprises at least two layers of LCD sheeting that, when illuminated by electromagnetic energy of one or more wavelengths, illuminate to provide the appearance of a three-dimensional image. The three-dimensional image may be mono-chromatic or polychromatic. The at least two layers of LCD sheeting preferably have pixel elements switchable between a non-scattering state and a scattering state. In one embodiment, the pixel elements are substantially transparent in the non-scattering state, and opaque in the scattering state.

The volumetric liquid crystal display includes at least one projection system to provide at least one array of electromagnetic energy of one or more wavelengths. The electromagnetic energy from the projection system intersects energized layers of LCD sheeting to illuminate image slices. In one embodiment, the pixel elements in the scattering state form the image slices used to form the three-dimensional image by successive illumination of the image slices formed by the pixel elements in the scattering state on the LCD sheeting. The pixel elements in the scattering state scatter the electromagnetic energy to provide the appearance of a three-dimensional image. In one version, successive illumination is on sequential layers of LCD sheeting. The electromagnetic energy is preferably in the visible wavelengths.

The layers of LCD sheeting may be comprised of polymer-dispersed liquid crystal between transparent conductive sheets. The transparent conductive sheet can be provided with integral anti-reflective properties and/or an independent anti-reflective coating.

The projection system includes at least one projector such as, for example, a digital light processing projector, a grating light valve projector, and/or the like. Use of a digital light processing projector having a digital micro-mirror device containing an array of micromechanical mirrors to project the electromagnetic energy can provide a mechanism for dithering the array of electromagnetic energy. Preferably, the projector directs at least three different colors of non-visible light beams such as red, green and blue.

The volumetric liquid crystal display may include a control system for synchronizing the successive illumination of image slices on layers of LCD sheeting. The control system may incorporate a three-dimensional anti-aliasing algorithm allowing the three-dimensional image to be seen as if it is a continuous image and virtually eliminate visual discontinuities. Additionally, the control system may optionally interface with an external source in order to provide images to the volumetric liquid crystal display. The external source may include a computer, a processor, a game console, the Internet or the like.

The volumetric liquid crystal display may optionally comprise a housing containing the volumetric image space and/or projection system. In addition to providing support for the volumetric image space and/or projection system, the housing may provide an element of safety in securing the layers of LCD sheeting from outside contact with a user or spectator. Additionally, the volumetric liquid crystal display may include a filter, such as an electromagnetic radiation filter, preventing exposure of non-visible radiation to the user or spectator.

In one embodiment, the volumetric image space comprises at least two non-planar layers of LCD sheeting in a circular cylindrical formation. The circular cylindrical formation provides a central longitudinal axis in which the electromagnetic energy of one or more wavelengths can be rotatingly projected and/or reflected to illuminate the layers of LCD sheeting. Successive illumination of the layers of LCD sheeting provides the appearance of a three-dimensional image.

In another embodiment, the volumetric image space comprises at least two non-planar layers of LCD sheeting in a hemispherical formation having a radial center. The projection system projects or reflects electromagnetic energy of one or more wavelengths from a location at or adjacent to the radial center to successively illuminate layers of LCD sheeting so as to provide the appearance of a three-dimensional image.

In another embodiment, the projection system comprises a first projector providing electromagnetic energy of one or more wavelengths rotatingly projected outward from a first location within the volumetric image space. Additionally, the projection system includes a second projector providing electromagnetic energy of one or more wavelength from a second location. The second location may be internal or external to the volumetric image space. The electromagnetic energy from the first projector and the second projector intersect the energized layer of LCD sheeting to illuminate image slices. Successive illumination of image slices on layers of LCD sheeting provides the appearance of a three-dimensional image. In one version, the illumination of LCD sheeting is on sequential layers. Additional projectors may be used to provide assistance in projecting additional arrays of electromagnetic energy.

In another aspect, the present invention is directed towards a method of forming a three-dimensional image. A volumetric image space having at least two non-planar layers of LCD sheeting is formed. The LCD sheeting is selectively energized to form image slices. A projector is positioned to illuminate image slices on the non-planar layers of LCD sheeting to provide the appearance of a three-dimensional image.

In another aspect, the present invention is directed towards a method of controlling a volumetric liquid crystal display comprising a volumetric image space having at least two non-planar layers of LCD sheeting, wherein each layer of LCD sheeting is selectively energized to form image slices. A projector, positioned relative to the volumetric image space, successively illuminates image slices on the layers of LCD sheeting. The successive formation and illumination of image slices on the layers of LCD sheeting is synchronized to provide the appearance of a three-dimensional image. In one version, the successive formation and illumination of image slices on the layers of LCD sheeting is sequential.

BRIEF DESCRIPTION OF THE SEVERAL VIEW OF THE DRAWINGS

So that the above recited features and advantages of the present invention can be understood in detail, a more particular description of the invention, briefly summarized above, may be had by reference to the embodiments thereof that are illustrated in the appended drawings. It is to be noted however that the appended drawings illustrate only typical embodiments of the invention and are therefore not to be considered limiting of its scope, for the invention may admit to other equally effective embodiments.

DETAILED DESCRIPTION OF THE EMBODIMENTS

Figure 1A:
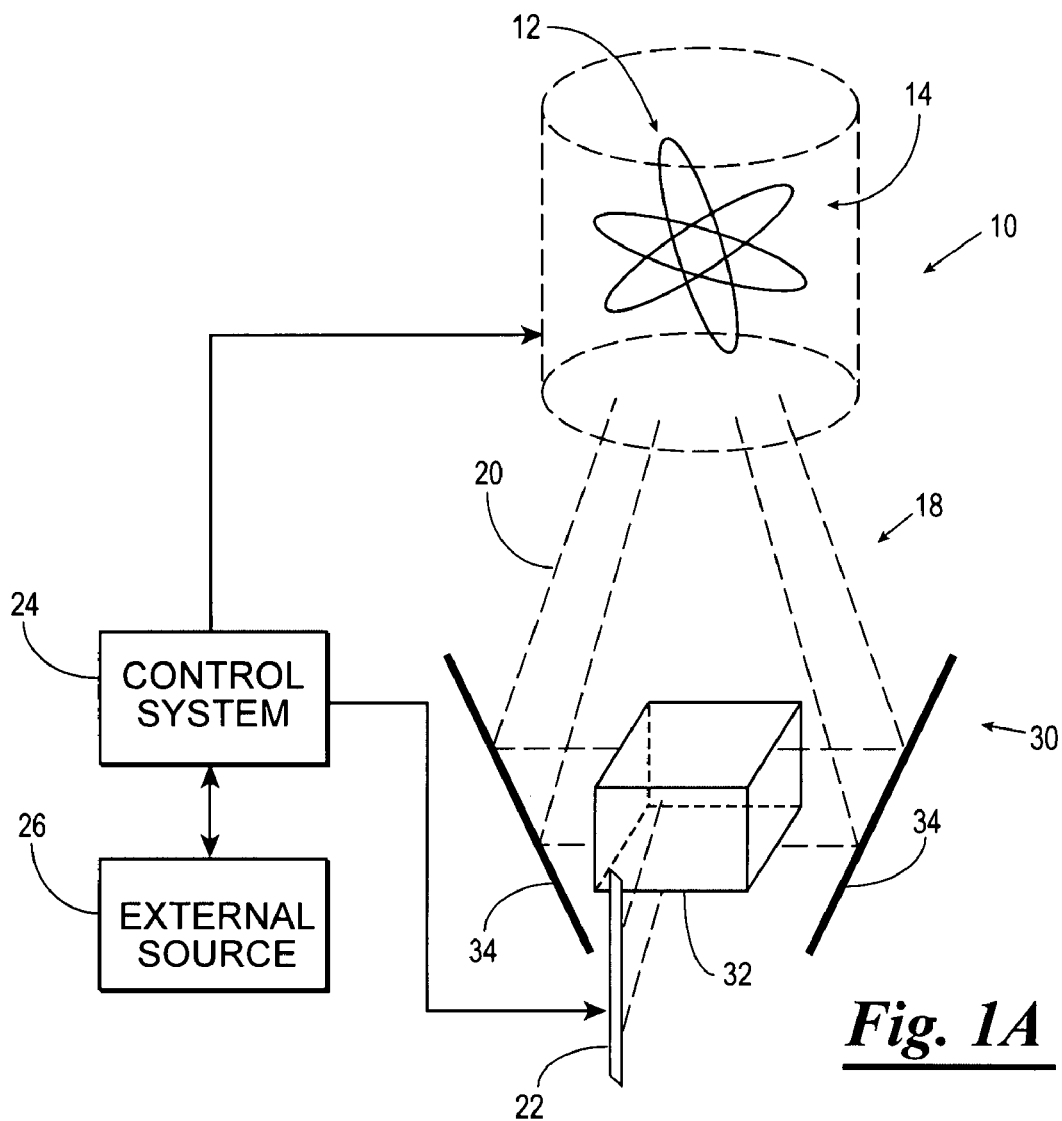
FIG. 1A is a schematic block diagram of one embodiment of a volumetric liquid crystal display having layers of LCD sheeting providing a three-dimensional image in accordance with the present invention.

Present embodiments of the invention are shown in the above-identified figures and described in detail below. In describing the embodiments, like or identical reference numerals are used to identify common or similar elements. The Figures are not necessarily to scale and certain features in certain views of the Figures may be shown exaggerated in scale or in schematic in the interest of clarity and conciseness.

Figure 1B:
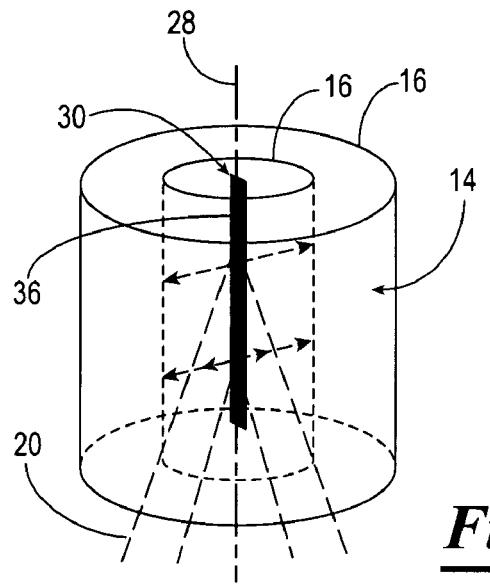
FIG. 1B illustrates the volumetric image space represented in FIG. 1A.

Referring now to the drawings, and in particular to FIGS. 1A & 1B, shown therein and designated by reference numeral 10 is a volumetric liquid crystal display 10, constructed in accordance with the present invention, for providing a three-dimensional image 12 within a volumetric image space 14. In general, the volumetric image space 14 includes at least two layers of LCD sheeting 16 selectively energized to form image slices that illuminate when energized by electromagnetic energy. The at least two layers of LCD sheeting 16 preferably have pixel elements switchable between a non-scattering state and a scattering state and vice-versa. In one embodiment, the pixel elements are substantially transparent in the non-scattering state, and opaque in the scattering state. In one embodiment, the pixel elements in the scattering state form the image slices.

Successive illumination of image slices provides the appearance of the three-dimensional image 12. In one version, successive illumination of image slices may be on sequential layers of the LCD sheeting 16. Depending on the projected electromagnetic energy and/or type of LCD sheeting 16 used, the volumetric liquid crystal display 10 is able to produce monochromatic images and/or polychromatic images. In alternative embodiments, the images may be generated to display an overall image having a mixed 2D and 3D appearance. For example, a 2D text as a caption below a 3D image, or 2D text on at least one of the layers of the LCD sheeting 16.

The volumetric liquid crystal display 10 includes a projection system 18 projecting at least one array 20 of electromagnetic energy of one or more wavelengths. The projection system 18 includes at least one projector 22 such as, for example, a digital light processing projector, a grating light valve projector, and/or the like. The electromagnetic energy from the projection system 18 intersects the energized layers of LCD sheeting 16 to illuminate image slices. Using a single projector 22 illuminating image slices at approximately 1000/second, the volumetric image space 14 is refreshed at approximately 50 times/second. An increase in the projection speed of the projectors 22 may provide an improved refresh rate and also improved resolution, color selectivity, and/or brightness.

The layers of LCD sheeting 16 may be comprised of polymer-dispersed liquid crystals between transparent conductive sheets. Any transparent or substantially-transparent material, such as glass, plastic, airspacers, and/or the like, may be used to form the conductive sheets as long the transparency and/or transmissivity of the LCD sheeting 16 can be selectively controlled. For example, the conductive sheets may be formed of sputtered or evaporated thin film oxide having transparency and low resistance.

Additionally, the transparent conductive sheets forming the LCD sheeting 16 can be provided with integral anti-reflective properties and/or an anti-reflective coating. Anti-reflective materials can reduce the amount of reflected light substantially eliminating such as unwanted reflections.

Preferably, the volumetric liquid crystal display 10 comprises anywhere from about five layers to about 100 layers of LCD sheeting 16. However, any number of layers of LCD sheeting 16 may be used as long as the successive illumination of the LCD sheeting 16 provides the appearance of a three-dimensional image 12. The layers of LCD sheeting 16 may be planar and/or non-planar.

In one embodiment, pixel elements in the LCD sheeting 16 are opaque when energized and transparent when de-energized. Control of the LCD sheeting 16 may be through electric means, magnetic means, and/or the like. Each layer of the LCD sheeting 16 includes a single LCD element having a controllable variable translucency. The single LCD element is controlled to have an opaque light-scattering state to receive and display at least a portion of the image 12 from the projector system 18; and the remaining liquid crystal elements are controlled to be substantially transparent to allow the viewing the displayed image on the opaque liquid crystal element.

In the preferred embodiment, the LCD sheeting 16 is electrically controlled. Voltage applied to a single LCD element defined within the LCD sheeting 16 generates an electric field causing the liquid crystals in the LCD sheeting 16 to align such that the single LCD element is substantially energized allowing the transmission of light through with light or no scattering. The single LCD element is thus substantially transparent.

In contrast, when there is no applied voltage, the liquid crystals in the LCD sheeting 16 are randomly oriented such that the LCD sheeting 16 is substantially de-energized and opaque. Since light projected onto the LCD sheeting 16 is scattered, the electromagnetic energy projected from the projection system 18 illuminates the opaque portions of the LCD sheeting 16 providing image slices.

The volumetric liquid crystal display 10 may include a control system 24 for synchronizing the successive illumination of the image slices on layers of LCD sheeting 16. The control system 24 may incorporate a three-dimensional, anti-aliasing algorithm allowing the three-dimensional image 12 to be seen as if it is a continuous image and virtually eliminate perceived visual discontinuities. The algorithm provides a means to generate interstitial virtual images between adjacent parallel layers of LCD sheeting 16 giving the three-dimensional image 12 a continuous appearance.

The control system 24 may optionally communicate with an external source 26, such as a computer, processor, game console, Internet, and/or the like, to provide external control, external programming, permitting measurement and reporting of information regarding the volumetric liquid crystal display 10, and/or downloading of images to the control system 24. The external source 24 can be either proximally located to the volumetric liquid crystal display 10 or located at a distance so long as the there is communication between the control system 24 and the external source 26. Communication between the control system 24 and the external source 26 can be wired and/or wireless.

In the embodiment illustrated in FIGS. 1A & 1B, the volumetric image space 14 comprises at least two non-planar layers of LCD sheeting 16 in a circular cylindrical formation having a 360 degree circumference. The circular cylindrical formation of the non-planar layers of LCD sheeting 16 defines a central longitudinal axis 28 in which the array 20 of electromagnetic energy having one or more wavelengths can be rotatingly projected. The layers of LCD sheeting 16 are selectively energized to produce image slices that illuminate when energized by electromagnetic energy as discussed above. The projection system 18 directs, from the central longitudinal axis 28, the array 20 of electromagnetic energy to intersect the non-planar layers of LCD sheeting 16 illuminating image slices. Successive illumination of image slices provides the appearance of the three-dimensional image 12.

The projector system 18 generates the array 20 of electromagnetic energy toward the circular cylindrical formation of layers of LCD sheeting 16 within the volumetric image space 14 through the use of the projector 22. Preferably, in this embodiment, the projector 22 is a GLV projector, although any other type of projector 22 may be used as long as the projector 22 generates electromagnetic energy having one or more wavelengths. In general, a GLV is a diffractive micro-opto-electro-mechanical system (MOEMS) spatial light modulator capable of very high-speed modulation of light combined with fine gray-scale attenuation. The GLV is capable of projecting electromagnetic energy of one or more wavelengths through a second dimension, creating a full high-definition image.

As discussed above, the array 20 of electromagnetic energy from the projector 22 is directed towards the layers of LCD sheeting 16 within the volumetric image space 14. Preferably, the array 20 is directed towards the volumetric image space 14 through the use of a steering system 30. The steering system 30, may include a prism 32 for dividing the array 20 of electromagnetic energy into at least two directions. Additionally, one or more mirrors 34 can reflect the array 20 of electromagnetic energy towards a rotating mirror 36 mounted along the central longitudinal axis 28. As described, mirrors may include reflective mirrors and/or deformable mirrors that can be mechanically or electrically altered to guide the array 20 of electromagnetic energy from the projector 22 to the volumetric display 14.

At least one side of the rotating mirror 36 is constructed of materials having reflective properties and/or coated with a reflective coating. Additionally, at least one side of the rotating mirror 36 can be constructed of materials having absorptive properties and/or coated with an absorptive coating.

For simplicity of control, the rotating mirror 36 preferably makes repeated, complete revolutions in a single direction about the central longitudinal axis 28. However, the rotating mirror 36 may also make partial revolutions in either direction or may alternate directions as may be advantageous for particular applications. For example, the rotating mirror 36 may sequentially rotate 270 degrees clockwise, 180 degrees counterclockwise, and 360 degrees clockwise. Similarly, the rotating mirror 36 may alternate between partial and complete revolutions in alternating directions as well.

The rotating mirror 36 rotates about the central longitudinal axis 28 to reflect the array 20 of electromagnetic energy towards the selectively energized layer of LCD sheeting 16 from the central longitudinal axis 28. Illumination of the image slices in the circular cylindrical formation produces a three-dimensional image 12 that can be viewed from any direction around the 360 circumference.

Figure 2:
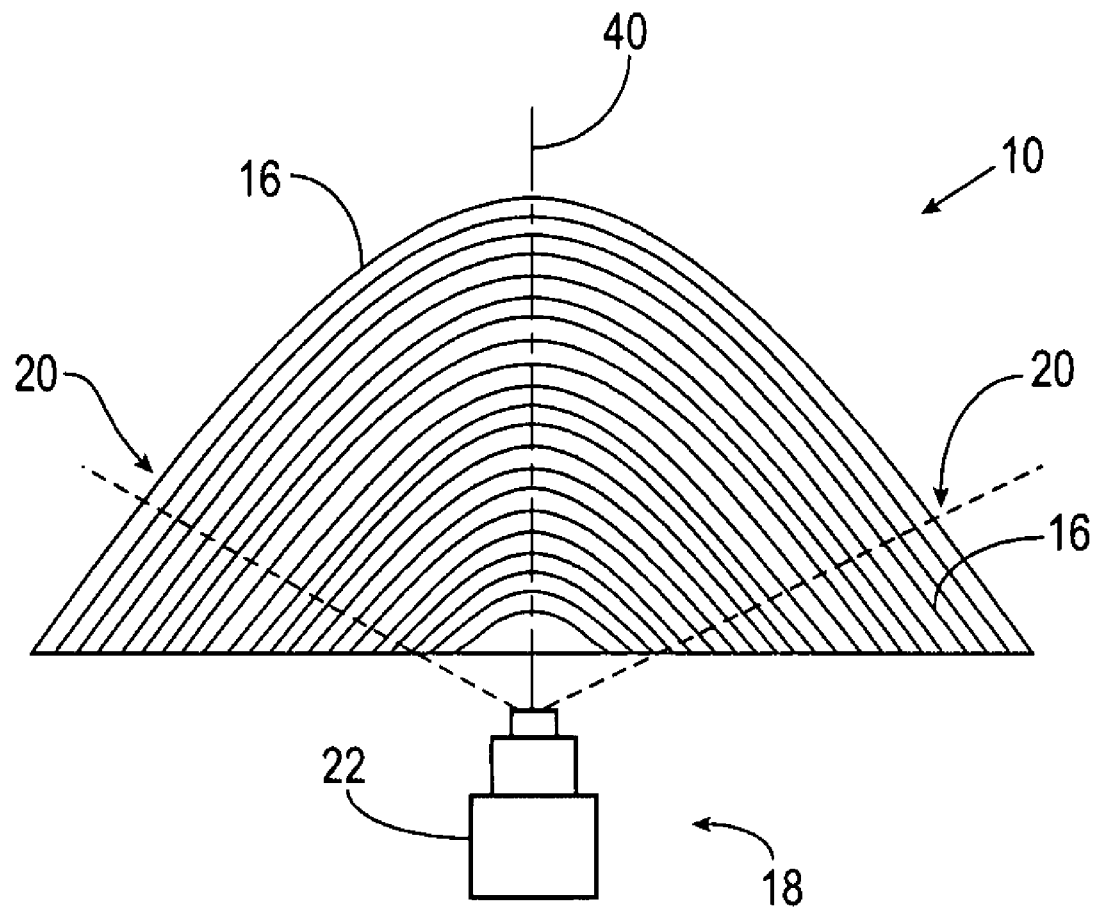
FIG. 2 is a schematic diagram of another embodiment of a volumetric liquid crystal display having layers of LCD sheeting for providing a three-dimensional image in accordance with the present invention.

FIG. 2 illustrates another embodiment of the volumetric liquid crystal display 10, constructed in accordance with the present invention. The volumetric liquid crystal display 10 comprises at least two non-planar layers of LCD sheeting 16 in a hemispherical formation having a radial center 40. Preferably, the layers of LCD sheeting 16 are substantially uniformly spaced. Alternatively, there may be variations in the spacing between the layers of LCD sheeting 16. Pixel elements in the hemispherical layers of LCD sheeting 16 are selectively switched to the scattering state, e.g., energized to produce image slices that scatter light and thereby illuminate when energized by the array 20 of electromagnetic energy as discussed above. The pixel elements in the scattering state are successively illuminated to form the appearance of the three-dimensional image 12.

The projector system 18 provides electromagnetic energy of one or more wavelengths from the projector 22 located external to the volumetric image space 14. Preferably, the projection system 18 is located along the radial center 40 of the hemispherical formation of the non-planar LCD sheeting 16.

Examples of suitable projectors 22 include DLP projectors, GLV projectors, or the like. Preferably, in this embodiment, the projector 22 is a DLP projector, although any other type of projector 22 may be used as long as the projector 22 generates electromagnetic energy having one or more wavelengths. In general, DLP projectors include a digital micromirror device (DMD) containing an array of micromechanical mirrors producing resolutions of super video graphics array (SVGA) 800×600 pixels; extended graphics array (XGA), 1024×768 pixels; 720 p 1280×72; and 1080 p, 1920× 1080 pixels, pico-size DMD, and/or other like matrices.

Examples of DLP projectors include, but are not limited to, the Discovery 110 model which uses 0.7 XGA DDR DMD and operates at 60 MHz DDR clock providing 7.7 GbS data transfer rate and the Discovery 3000 which uses the 0.7 XGA LVDS DMD operating at 200 MHz DDR clock and providing a 12.8 GbS data transfer rate.

Figure 3:
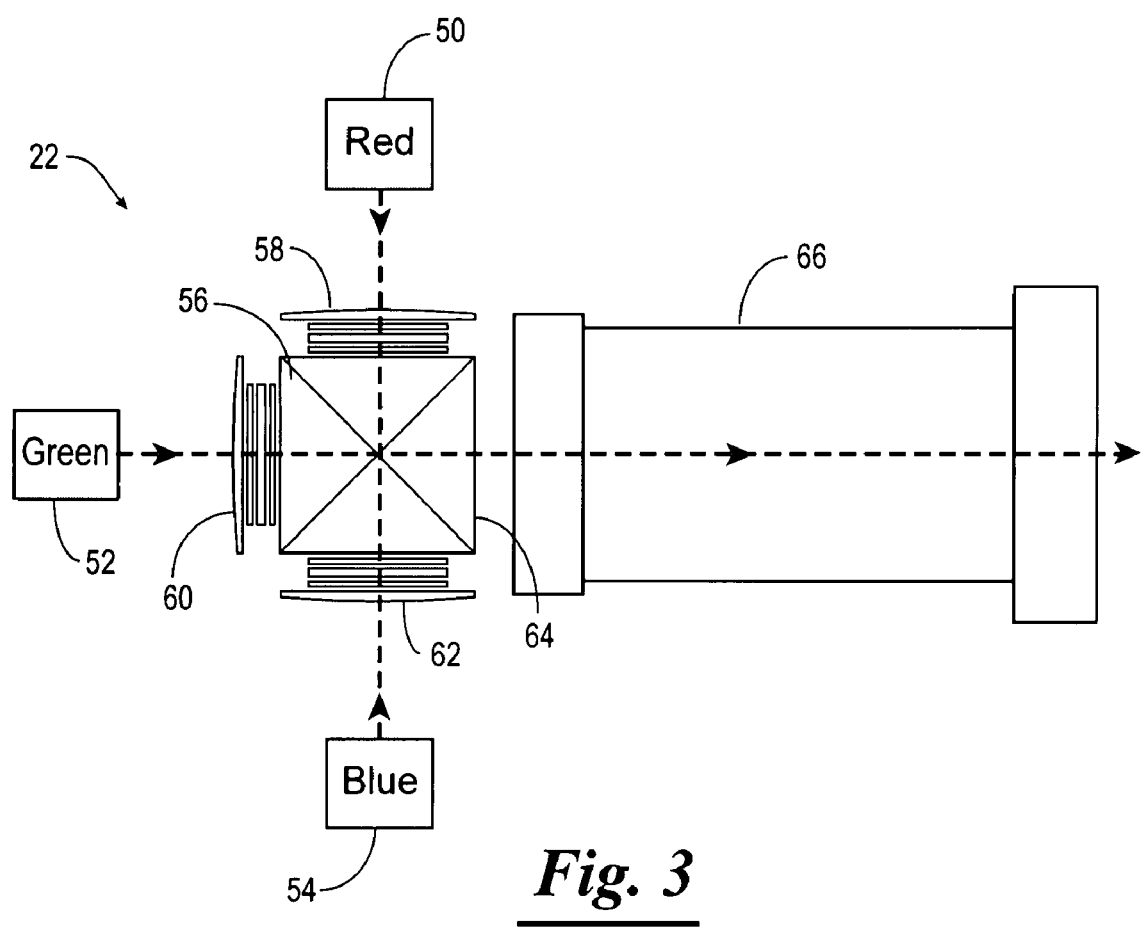
FIG. 3 is a schematic view of one example of a projector in accordance with the present invention.

To project greater fidelity and brightness of the three-dimensional image 12, a three-chip DLP projector may be used. FIG. 3 illustrates an example of the projector 22 using three-chip DLP technology with three different light sources, 50, 52, and 54. The light sources 50, 52, and 54 may include lasers, coherent LEDs, or the like. Other light sources may be used as long as the spectral line width of the light source is directional.

Each of the light sources 50, 52, and 54 preferably provides a separate wavelengths passing through a special four-sided prism 56. For example, the light sources 50, 52 and 54 may emit red, green and/or blue light. The prism 56 guides the wavelengths from each of the light sources 50, 52, and 54 to the corresponding DMD 58, 60, and 62 respectively. The wavelengths from each of the light sources, 50, 52, and 54 are reflected from the DMD surfaces, 58, 60, and 62 and combined. The combination is passed through an open fourth side 64 of the prism 56 to the projection lens 66. The projection lens 66 directs the combination towards the volumetric image space 14 where they intersect with the hemispherical layers of LCD sheeting 16.

The projector 22, utilizing DLP projection, may also provide a mechanism for dithering the electromagnetic energy projected. In this technique, the layers of LCD sheeting 16 receive electromagnetic energy that has been reflected from a plurality of micromechanical mirrors; the brightness is then controlled by selecting the number of micromechanical mirrors in this plurality. For example, using a 2×2 array of DLP micro-mirrors provides a relative color depth per voxel from zero to four depending on how many mirrors in the array group are activated at any given time. Larger micro-mirror array groups can provide corresponding greater color depth. It is noted that this dithering method decreases the overall resolution of the display 10 and that multiplexing the micromirrors in time or controlling the laser power and/or laser activation timing to provide color depth are the preferred embodiments.

Figure 4:
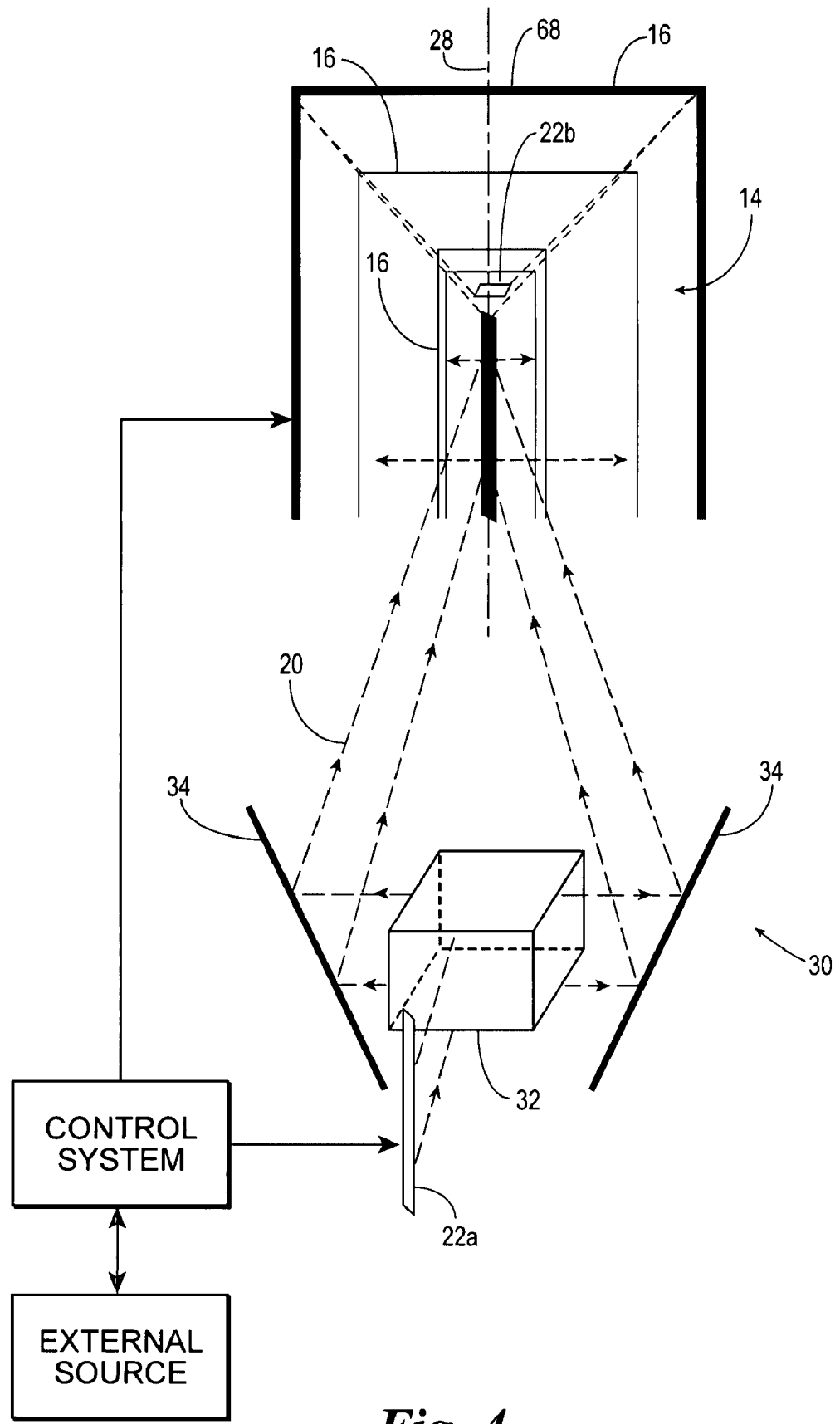
FIG. 4 is a schematic block diagram of another embodiment of a volumetric liquid crystal display having layers of LCD sheeting for providing a three-dimensional image in accordance with the present invention.

In another embodiment, as illustrated in FIG. 4, the volumetric image space 14 comprises at least two layers of LCD sheeting 16 in a rectangular cylindrical formation having at least one closed end 68. The cylindrical formation may also be formed with any suitable cross sectional shape, for example, circular, rectangular, hexagonal, fanciful, or the like. The rectangular cylindrical formation of LCD sheeting 16 defines a central longitudinal axis 28 in which electromagnetic energy can be rotatingly projected and/or outwardly projected. The projector system 18 includes at least two projectors, 22a and 22b, providing at least two arrays, 20a and 20b, of electromagnetic energy of one or more wavelengths to illuminate the layers of LCD sheeting 16.

The first projector 22a provides the array 20a of electromagnetic energy from a first location within the volumetric image space 14. Preferably, the array 20a is rotatingly reflected towards the layers of LCD sheeting 16 from the central longitudinal axis 28 through the use of a steering system 30. As discussed above, the steering system 30 may include a prism 32 for dividing the array 20 of electromagnetic energy into at least two directions. Additionally, one or more mirrors 34, can reflect the array of electromagnetic energy towards a rotating mirror 36 mounted along the central longitudinal axis 28.

The second projector 22b projects the array 20b of electromagnetic energy of one or more wavelengths towards the closed end 68 of the rectangular cylindrical formation from a second location. The second location of the second projector 22b may be internal or external to the volumetric image space 14. Preferably, the second projector 22b is located internal to the volumetric image space, as illustrated in FIG. 4. The second projector 22b may be also aligned with the central longitudinal axis 28. It is further contemplated that additional projectors may be used to provide assistance in projecting additional arrays of electromagnetic energy. Additional projectors may provide an improved refresh rate and/or improved resolution, color selectivity, and/or brightness.

The combination of the first projector 22a and the second projector 22b ensures all layers of the LCD sheeting 16 are capable of being illuminated by electromagnetic energy. The electromagnetic energy from the first projector 22a and the second projector 22b intersect with layers of LCD sheeting 16 having pixels elements in the scattering state to illuminate image slices as described above. Successive illumination of image slices provides the appearance of the three-dimensional image 12. The successive illumination of image slices may be on sequential layers of the LCD sheeting 16.

Figure 5:
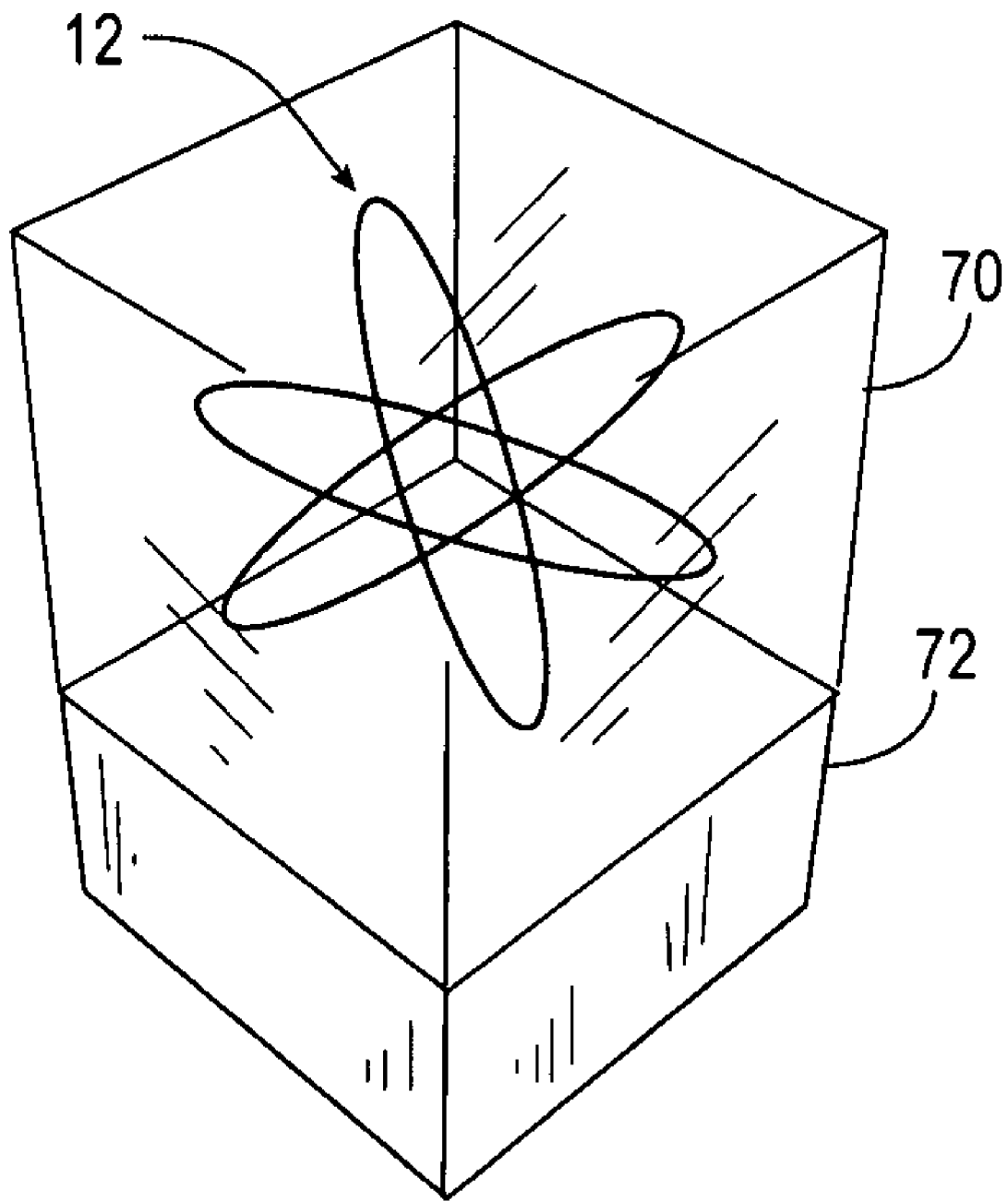
FIG. 5 is a perspective view of one version of a light surface display housing in accordance with the present invention.

As illustrated in FIG. 5, the volumetric liquid crystal display 10 may optionally include a housing 70 surrounding the three-dimensional image 12. In addition to providing support for the volumetric image space 14 and/or projection system 18, the housing 70 may provide an element of safety in securing the layers of LCD sheeting 16 and/or projection system 18 from outside contact with a user or spectator. The housing 70 is constructed of a transparent material forming a transparent area so that the user or spectator located outside the housing 70 can view the three-dimensional image 12 within the housing 70. It should be understood that the amount and/or shape of the transparent material forming the housing 70 can be varied depending upon a number of factors, such as the desired optical effect, or the end-use of the volumetric liquid crystal display 10. The housing 70 may additionally enclose the projection systems 18 and/or control system 24. The housing 70 may also have an opaque area 72 so as to hide various parts of the volumetric liquid crystal display 10 from the view of the user or spectator outside of the housing 70. For example, the projection system 18 and/or control system 24 can be located adjacent to the opaque area 72 so as to hide the projection systems 18 and/or control system 24 from the user or spectator.

Additionally, the volumetric liquid crystal display 10 can include a filter, such as an electromagnetic radiation filter, preventing exposure of non-visible radiation to the user or spectator. The filter may be integral to the housing 70 or separate from the housing 70.

In another aspect of the present invention, a method of fabricating a three-dimensional image is provided. The method includes forming the volumetric image space 14 comprising at least two layers of LCD sheeting 16. The layers of LCD sheeting 16 are selectively energized to form image slices. The projector system 18 illuminates images on the LCD sheeting 16 to provide illuminated image slices. Successive illumination of the image slices provides the appearance of a three-dimensional image 12. The successive illumination of image slices may be provided on sequential layers of the LCD sheeting 16.

In another aspect of the present invention, a method of controlling a volumetric liquid crystal display 10 is provided. The volumetric liquid crystal display 10 comprises at least two layers of LCD sheeting 16. Each layer of LCD sheeting 16 is selectively energized to form image slices. A projector is positioned to illuminate image slices on the layers of LCD sheeting 16. The image slices on the layers of LCD sheeting are synchronized to provide the appearance of the three-dimensional image 12.

The foregoing disclosure includes the best mode for practicing the invention. It is apparent, however, that those skilled in the relevant art will recognize variations of the invention that are not described herein. While the invention is defined by the appended claims, the invention is not limited to the literal meaning of the claims, but also includes these variations.

What is claimed:

1. A volumetric liquid crystal display for producing a three-dimensional image, comprising:
    a volumetric image space comprising at least two layers of LCD sheeting, each layer of LCD sheeting selectively energized to form image slices, the volumetric image space having a central longitudinal axis;
    at least one projection system providing at least one array of electromagnetic energy of one or more wavelengths; and,
    at least one mirror reflecting the array of electromagnetic energy towards a rotating mirror mounted along the central longitudinal axis of the volumetric image space, the rotating mirror providing the intersection of the array of electromagnetic energy with the energized layer of LCD sheeting to illuminate image slices, wherein illumination of image slices on the layers of LCD sheeting provides the appearance of a three-dimensional image.

2. The display of claim 1, wherein each layer LCD sheeting comprises polymer-dispersed liquid crystal between transparent conductive sheets.

3. The display of claim 1, wherein the projection system includes at least one digital light processing projector having a digital micro-mirror device containing an array of micro-mechanical mirrors.

4. The display of claim 3, wherein the micro-mirror device is used in dithering the array of electromagnetic energy.

5. The display of claim 1, wherein the projection system includes at least one grating light valve projector providing the at least one array of electromagnetic energy.

6. The display of claim 1, wherein the layers of LCD sheeting are provided in a circular cylindrical formation within the volumetric image space.

7. The display of claim 6, wherein the array of electromagnetic energy of one or more wavelengths is rotatingly provided outward from the central longitudinal axis.

8. The display of claim 1, wherein the layers of LCD sheeting are provided in a hemispherical formation within the volumetric image space, the hemispherical formation having a radial center.

9. The display of claim 8, wherein a second projector providing electromagnetic energy to the image space is located adjacent the radial center.

10. The display of claim 9, wherein the hemispherical formation is comprised of about nineteen to about one hundred layers of LCD sheeting.

11. The display of claim 1, further comprising a control system synchronizing the illumination of image slices on the layers of LCD sheeting to provide the appearance of the three-dimensional image.

12. The display of claim 11, wherein the illumination of image slices on the layers of LCD sheeting is sequential.

13. The display of claim 11, wherein the control system is in communication with an external source for downloading images.

14. The display of claim 1, wherein the illuminated three-dimensional image is polychromatic.

15. The display of claim 1, wherein power of the projection system is modulated to vary the intensity of electromagnetic energy of the wavelengths.

16. The display of claim 1, wherein at least one side of the rotating mirror includes an absorptive material.

17. The display of claim 1, further comprising a housing supporting the volumetric image space.

18. The display of claim 17, wherein the housing includes an electromagnetic radiation filter.

19. The display of claim 1, wherein illumination of image slices on the layers of LCD sheeting is sequential.

20. A volumetric liquid crystal display for producing a three-dimensional image, comprising:
    a volumetric image space comprising at least two layers of LCD sheeting in a formation, each layer of LCD sheeting selectively energized to form image slices
    a first projector providing electromagnetic energy of one or more wavelengths rotatingly reflected outwardly from a first location within the volumetric image space;
    a second projector providing electromagnetic energy of one or more wavelengths from a second location, wherein electromagnetic energy from the first projector and the second projector intersect the energized layer of LCD sheeting to illuminate image slices, wherein illumination of image slices on sequential layers of LCD sheeting provides the appearance of a three-dimensional image.

21. The display of claim 20, wherein the second location is within the volumetric image space.

22. The display of claim 20, wherein the second location is external to the volumetric image space.

23. The display of claim 20, wherein the formation is rectangular.

* * * * *